United States Patent
Schlangen

(10) Patent No.: US 7,103,809 B2
(45) Date of Patent: Sep. 5, 2006

(54) SERVER SELECTION METHOD

(75) Inventor: Thomas J. Schlangen, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 552 days.

(21) Appl. No.: 10/693,281

(22) Filed: Oct. 24, 2003

(65) Prior Publication Data

US 2005/0091217 A1    Apr. 28, 2005

(51) Int. Cl.
*G06F 11/00* (2006.01)

(52) U.S. Cl. .............. 714/47; 714/4; 714/26; 709/223; 709/224; 709/225; 702/182; 702/183

(58) Field of Classification Search ............ 714/4, 714/26, 47; 709/223–225; 702/182–183; 710/113
See application file for complete search history.

(56) References Cited

U.S. PATENT DOCUMENTS

| | | | | |
|---|---|---|---|---|
| 5,088,024 A * | 2/1992 | Vernon et al. | ............... | 710/111 |
| 5,475,813 A * | 12/1995 | Cieslak et al. | ................. | 714/4 |
| 6,714,960 B1 * | 3/2004 | Bitar et al. | ................. | 718/103 |
| 6,754,706 B1 * | 6/2004 | Swildens et al. | ............ | 709/225 |
| 6,877,053 B1 * | 4/2005 | Lahiri et al. | ................. | 710/113 |
| 2005/0193227 A1 * | 9/2005 | Nakahara et al. | .............. | 714/4 |
| 2006/0129665 A1 * | 6/2006 | Toebes et al. | .............. | 709/223 |

OTHER PUBLICATIONS

Sullivan et al, "Ticket and Currencies Revisited: Extending Multi-Resource Lottery Scheduling", IEEE Computer Society.*
Ramaswamy, Ramkumar, "Probablistic Application-Level Connection Scheduling in Web Servers", 2001, IEEE Distributed Systems Online, vol. 2 No. 8.*
Waldspurger, C. A. et al., "Lottery Scheduling: Flexible Proportional-Share Resource Management", $1^{st}$ USENIX Symposium on Operating Systems Design and Implementation, Nov. 1994, Monterey, CA.

* cited by examiner

*Primary Examiner*—Robert Beausoliel
*Assistant Examiner*—Emerson Puente
(74) *Attorney, Agent, or Firm*—Frank J. Bogacz

(57) ABSTRACT

A method for selecting (64) a server (30, 40 or 50) is based upon an available server capacity indication (66) for each of the servers. A server may become faulty. Repeated attempted selection (63) of a faulty server exponentially decreases (70) the probability of selecting the faulty server. The method performs a ratio of a currently available capacity for each server of a pool of servers to the total available capacity for all the servers in the pool (64). The server capacities for the pool of servers are dynamically changed (68, 70).

20 Claims, 3 Drawing Sheets

SERVER SELECTION METHOD

BACKGROUND OF THE INVENTION

The present invention pertains to communication systems and more particularly to server availability for pooled server architectures.

In modern communication systems, clients typically receive periodic advertisement from servers of a common pool indicating their availability and current traffic loading. The advertisement includes the status of each of a number of pooled servers. The client then typically performs a probabilistic selection from the pool based on the server's capacity. For example, if three servers had a capacity of 10, 40 and 50 call units, they would be selected approximately 10%, 40% and 50% of the time respectively.

If one of the servers from the pool is unavailable due to either network or server difficulties, the selection percentages remaining in effect until the network or server fault can be detected. If the frequency of a server's, or any other resource's, selection is significantly higher than the frequency with which the fault is detected, the faulty server or resource may be selected for use many times during the time period until the fault is detected.

During the faulty server time period, all attempted selections of the faulty server will lead to an increase in call setup time. Further, continued selection failures could result in loss of the call by the communication system. Such loss of the call may affect revenue by the communication system operator and sub-standard call services, as measured by a public utility commission, being supplied to a number of communication system users.

Further, unnecessary retries of server selection during a fault condition cause an increase in network and server central processing unit (CPU) utilization without calls being successfully connected. Such situation could exacerbate a transient server fault and network congestion.

Accordingly, it would be highly desirable to have a server lottery selection method which provides a low cost method for a client to dynamically adjust the probability of server selection during faulty conditions.

PREFERRED EMBODIMENT OF THE INVENTION

Figure 1:
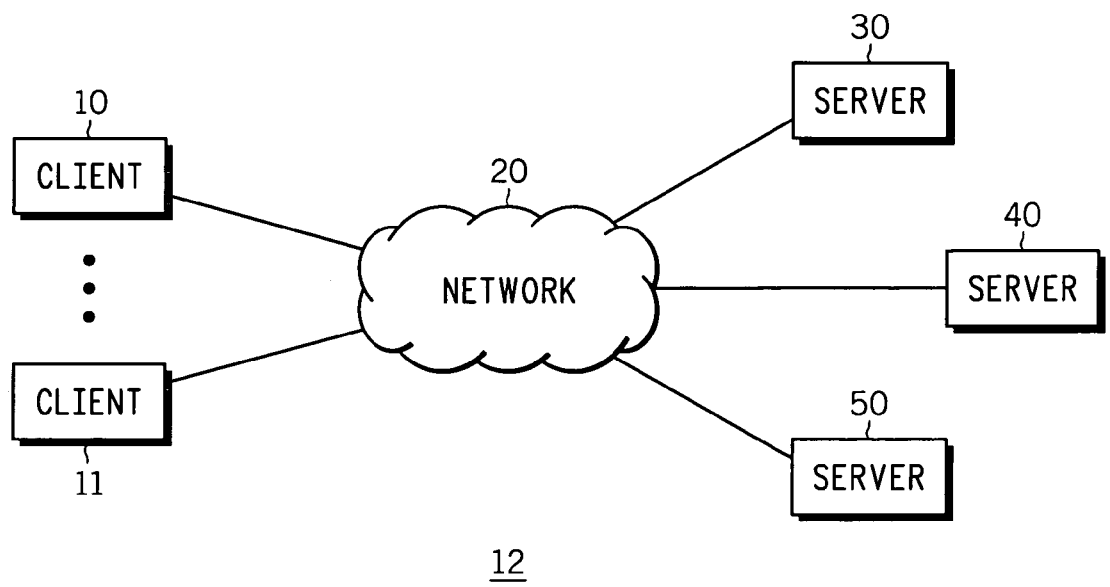
FIG. 1 is a block diagram of a communication system in accordance with the present invention.

Referring to FIG. 1, a distributed computing network 12 is shown. A client 10 communicates with one or more servers 30, 40, and 50 via a communication network 20. The communication network 20 provides unreliable message delivery service (i.e., under heavy load or upon receipt of corrupted messages, the network can and will discard messages). The communication network 20 does not provide any explicit indication of the resource availability of the attached network elements (clients such as 10 and servers 30, 40 and 50).

The exchange of resource availability data must be performed by the network elements (client 10 and servers 30, 40 and 50) themselves. However in the case of a server fault or network fault, the ability for the clients and servers to communicate is compromised. Such faults lead to inaccurate data feeding into the lottery selection method shown below in FIG. 2.

A server fault is defined as any condition that renders the server incapable of fulfilling its role in the network, e.g., a software failure results in the server being offline while the server reboots; a hardware failure results in the server being offline until the failed hardware can be replaced.

A network fault is defined as any condition that renders the network incapable of providing message delivery service for the clients and servers, e.g., hardware faults, software faults, and network congestion cause messages to be discarded, which effectively disconnects the communication paths between the clients and servers.

Figure 2:
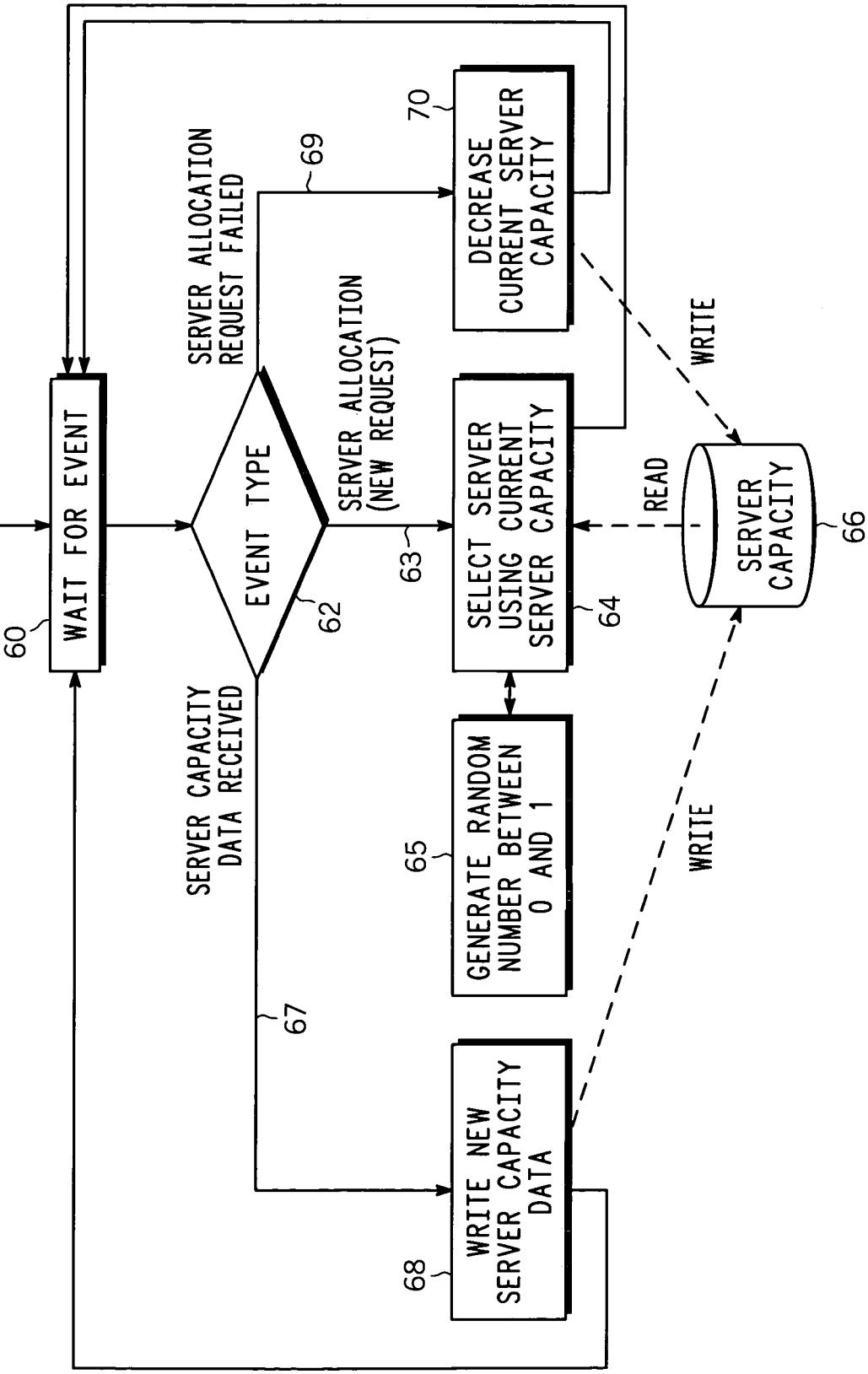
FIG. 2 is a flow chart of a server lottery selection method in accordance with the present invention.

Referring to FIG. 2, a flow chart diagram of the lottery selection method with the dynamic recovery improvement is shown. Client 10 is ready to accept inbound events at block 60. Upon receipt of an event at block 62, the lottery selection method 61 determines and handles one of three event types.

Upon receipt of a server resource advertisement 67, control is transferred from block 62 to block 68. At block 68, the new server resource data is written to the resource database 66.

Server resource advertisements indicate the type and magnitude of resources that a server is able to provide to the client. For example, a telephone network server advertises to clients that it has the capacity to support 500 telephone calls with a current load of 150 active telephone calls. Clients 10, 11, etc. use this data to effectively distribute the load of future telephone calls across the available telephone network servers.

Upon receipt of a server allocation request 63, control is transferred from block 62 to block 64. Block 64 selects a server (30, 40 or 50) using the resource database 66 and the lottery selection method 61. Block 64 transfers control to block 65 to generate a random number between zero (0) and one (1). Then the selection is made as explained below. For example, client 10 has received the following resource advertisements 67:

Server 30: total capacity=500; active load=150.
Server 40: total capacity=600; active load=200.
Server 50: total capacity=700; active load=250.

The available network capacity equals the total server capacity minus the total active load:

Total Server Capacity=500+600+700=1800
Total Active Load=150+200+250=600
Available Network Capacity=1800−600=1200

Using the lottery selection method 61, client 10 makes a probabilistic selection of a server:

Server 30 has an available capacity of 500−150=350. Therefore server 30 should be selected with probability=350/1200=29.2%.
Server 40 has an available capacity of 600−200=400. Therefore server 40 should be selected with probability=400/1200=33.3%.
Server 50 has an available capacity of 700−250=450. Therefore server 50 should be selected with probability=450/1200=37.5%.

A computer (not shown) of the client 10 generates a random number between 0 and 1. The client 10 selects the server as follows:

If random number<=0.292, then select server 30 (29.2%)
If 0.292<random number<=0.625, then select server 40 (33.3%)
Otherwise, select server 50 (37.5%)

Lottery scheduling is a randomized resource allocation mechanism. Resource rights are represented by lottery tickets. Each allocation is determined by holding a lottery; the resource is granted to the client with the winning ticket. This effectively allocates resources to competing clients in proportion to the number of tickets that they hold.

Lottery tickets encapsulate resource rights that are abstract, relative, and uniform. They are abstract because they quantify resource rights independently of machine details. Lottery tickets are relative, since the fraction of a resource that they represent varies dynamically in proportion to the contention for that resource. Thus, a client will obtain more of a lightly contended resource than one that is highly contended; in the worst case, it will receive a share proportional to its share of tickets in the system. Finally, tickets are uniform because rights for heterogeneous resources can be homogeneously represented as tickets. These properties of lottery tickets are similar to those of money in computational economies.

Scheduling by lottery is probabilistically fair. The expected allocation of resources to clients is proportional to the number of tickets that they hold. Since the scheduling algorithm is randomized, the actual allocated proportions are not guaranteed to match the expected proportions exactly. However, the disparity between them decreases as the number of allocations increases.

The number of lotteries won by a client has a binomial distribution. The probability P that a client holding t tickets will win a given lottery with a total of T tickets is simply $P=t/T$. After N identical lotteries, the expected number of wins W is $E[W]=NP$, with variance $V[W]=NP(1-P)$. The coefficient of variation for the observed proportion of wins is $SQRT(NP(1-P))$. Thus, a client's throughput is proportional to its ticket allocation, with accuracy that improves with $SQRT(N)$. A single physical ticket may represent any number of logical tickets. This is similar to monetary notes, which may be issued in different denominations.

The number of lotteries required for a client's first win has a geometric distribution. The expected number of lotteries N that a client must wait before its first win is $E[N]=1/P$, with variance $V[N]=(1-P)/P^2$. Thus, a client's average response time is inversely proportional to its ticket allocation. The properties of both binomial and geometric distributions are well-understood.

With a scheduling quantum of 10 milliseconds (100 lotteries per second), reasonable fairness can be achieved over sub-second time intervals. As computation speeds continue to increase, shorter time quanta can be used to further improve accuracy while maintaining a fixed proportion of scheduler overhead.

Since any client with a non-zero number of tickets will eventually win a lottery, the conventional problem of starvation does not exist. The lottery mechanism also operates fairly when the number of clients or tickets varies dynamically. For each allocation, every client is given a fair chance of winning proportional to its share of the total number of tickets. Since any changes to relative ticket allocations are immediately reflected in the next allocation decision, lottery scheduling is extremely responsive.

Upon receipt of a failed server allocation event 69, block 60 62 transfers control to block 70. The server allocation failure event 69 results from either the server explicitly denying service or the server failing to respond to the allocation request within a predefined period of time.

The faulted server's available capacity metric in the resource database 66 is decreased 70 by a scaling factor. Using the example above for servers 30, 40 and 50 and illustrating a failure of server 40, the available capacity metric for server 40 is reduced from 400 to 200. This decrease in the capacity metric also decreases the overall network available capacity from 1200 to 1000. The probability of server selection is updated as follows.

Following Failure #1:
Server 30: probability=350/1000=35%.
Server 40: probability=200/1000=20%.
Server 50: probability=450/1000=45%.

After handling any of these events 67, 63, or 69, control is transferred from blocks 68, 64, or 70, respectively to block 60 to wait for the next event. The client 10 is then ready to accept the next event 60.

Figure 3:
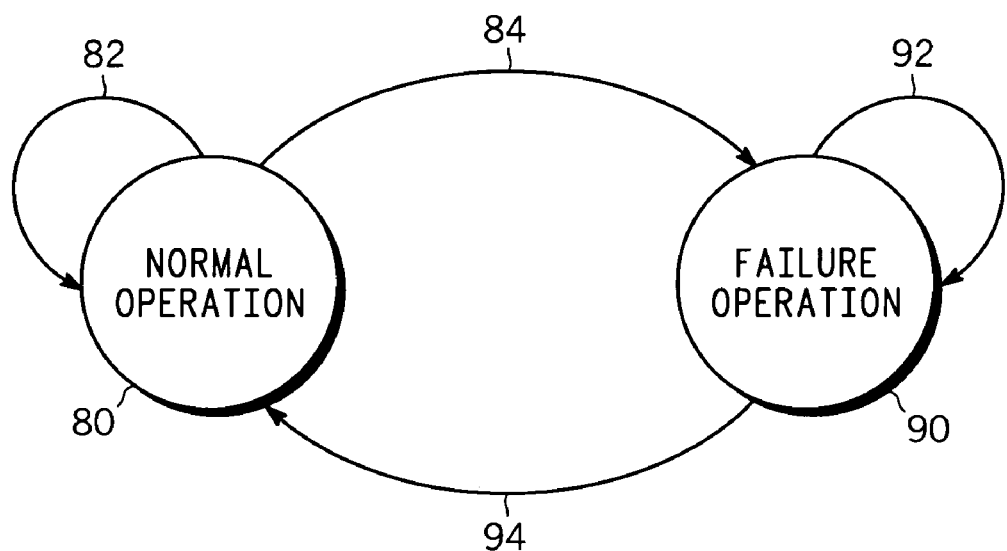
FIG. 3 is a state diagram of a server lottery selection method in accordance with the present invention.

Referring to FIG. 3, a state diagram is shown. The state diagram 99 depicts the transitions between normal operation 80 and failure operation 90.

Normal operation is defined as the condition where periodic server resource advertisements are being received and server allocation requests are being serviced successfully. Failure operation is defined as the condition where a server has failed to service one or more allocation requests, which results in a reduction in the probability of selecting that server.

The client 10 begins in normal operation 80. Upon receipt of a resource data advertisement 67, the client 10 updates the database 66 and continues normal operation 80 via path 82. While in normal operation 80, the distributed computing network has all server resources available. Also the clients 10, 11, etc. are balancing the offered load across the pool of servers.

Upon receipt of a server allocation failure event 69, the client 10 enters failure operation 90 via path 84. Each allocation failure event 69 causes the server's available capacity metric to be reduced by a scaling factor, which reduces the probability of the faulted server being selected during the next lottery selection.

Consecutive server allocation failure events 69 via path 92 result in an exponential decay in the probability of selecting the affected server.

Continuing the example above, a second allocation request failure for server 40 would further reduce its available capacity from 200 to 100, which also decreases the network available capacity from 1000 to 900. The probability of server selection is updated as follows.

Following Failure #2:
Server 30: probability=350/900=38.9%.
Server 40: probability=100/900=11.1%.
Server 50: probability=450/900=50%.

Additional allocation request failures continue to drive the exponential decay in the probability of selecting server 40 as follows.

Following Failure #3:
Server 30: probability=350/850=41.2%.
Server 40: probability=50/850=5.9%.
Server 50: probability=450/850=52.9%.

Following Failure #4:
Server 30: probability=350/825=42.4%.
Server 40: probability=25/825=3.0%.
Server 50: probability=450/825=54.5%.

Following Failure #5:
Server 30: probability=350/813=43.1%.
Server 40: probability=13/813=1.6%.
Server 50: probability=450/813=55.4%.

With a typical scaling factor of 0.5, ten consecutive failures would reduce the probability of selecting the affected server by a factor of approximately $0.5^{10} \approx 0.001$. This is due to the exponential nature of the decrease. Each allocation request failure reduces the server's available capacity metric by a factor of 0.5, and consecutive reductions are compounded, which results in a rapid decrease.

In an alternate embodiment, the scaling factor could be driven from a static table with a particular number of entries to accelerate or slow the effects of a fault. For example the table may include entries such as the following (e.g., 0.75, 0.50, 0.25, etc). Instead of multiplying by a fixed scaling factor, the scaling operation included in the data base 66, for example, and reference the static table to determine how much to reduce the available capacity metric for each detected fault.

During a server fault or network fault, the disclosed method enables the client to detect server allocation request failures (detection) and dynamically adjust the selection criteria (adjustment), which results in resource allocation requests being diverted away from the faulted server and toward the remaining available servers. In the example above, the probability of selecting server 40 dropped from 33.3% to 1.6% in five failure detections; under moderate client load, this adjustment would occur in less than one second.

Upon receipt of a resource data advertisement 67 from a faulted server, the new available resource capacity metric supercedes all previous reductions of that server's metric, which results in an immediate convergence to normal operation 80 via path 94 (recovery). For example, when a server recovers from a hardware or software fault, it will advertise its available capacity to the clients, and the clients will immediately begin using that data (i.e., the decay in probability is exponential during failure operation 90, but return to normal operation 80 is instantaneous).

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A server selection method for a communication system, the server selection method comprising the steps of:
   probabilistically selecting a server by a client;
   detecting by the client a fault associated with the server; and
   adjusting a probability of selecting the server with the fault including a step of reducing an available capacity indication of the server.

2. The server selection method as claimed in claim 1, wherein there is further included a step of storing and retrieving by the client the available capacity indication for the server from a database.

3. The server selection method as claimed in claim 1, wherein there is further included steps of:
   providing a plurality of servers; and
   providing an available capacity indication for each of the plurality of servers.

4. The server selection method as claimed in claim 1, wherein there is further included a step of iterating the steps of detecting and adjusting including the step of reducing the available capacity indication for the server with the fault responsive to a plurality of accesses to the server by the client.

5. The server selection method as claimed in claim 1, wherein the step of reducing the available capacity indication includes a step of minimizing the step of probabilistically selecting the server with the fault.

6. The server selection method as claimed in claim 1, wherein there is further included a step of requesting by the client a server allocation.

7. The server selection method as claimed in claim 1, wherein the step of detecting includes a step of determining by the client that a server allocation request has failed.

8. The server selection method as claimed in claim 1, wherein there is further included steps of:
   providing a plurality of servers;
   providing an available capacity indication for each of the plurality of servers
   selecting one server of the plurality of servers based on the one server with a greatest available capacity indication.

9. The server selection method as claimed in claim 8, wherein there is further included a step of generating a pseudo-random number for each of the plurality of servers based on a ratio of a currently available capacity indication to a total currently available capacity indication for the plurality of servers.

10. The server selection method as claimed in claim 9, wherein the step of generating a pseudo-random number for each of the plurality of servers includes a step of generating a pseudo-random number between zero (0) and one (1).

11. The server selection method as claimed in claim 9, wherein there is further included a step of writing to a database a new currently available capacity indication for each of the plurality of servers.

12. A server selection method for a communication system for selecting one server from a plurality of servers, the server selection method comprising the steps of:
   requesting a server by a client from the plurality of servers;
   selecting the server based on an available capacity indication for each of the plurality of servers;
   detecting by the client a fault associated with the selected server; and
   adjusting a probability of selecting the server with the fault including a step of reducing an available capacity indication of the server.

13. The server selection method as claimed in claim 12, wherein there is further included a step of storing and retrieving by the client the available capacity indication for each of the plurality of servers from a database.

14. The server selection method as claimed in claim 12, wherein there is further included a step of iterating the steps of selecting, detecting and adjusting including the step of reducing the available capacity indication for the server with the fault responsive to a plurality of accesses by the client.

15. The server selection method as claimed in claim 12, wherein the step of selecting the server includes a step of minimizing the step of selecting the server with the fault.

16. The server selection method as claimed in claim 12, wherein the step of selecting the server includes a step of selecting the one server from the plurality of servers based on the server having the greatest available capacity indication.

17. The server selection method as claimed in claim 12, wherein there is further included a step of generating a pseudo-random number for each of the plurality of servers based on a ratio of a currently available capacity indication to a total currently available capacity indication for the plurality of servers.

18. The server selection method as claimed in claim 17, wherein the step of generating a pseudo-random number for each of the plurality of servers includes a step of generating a pseudo-random number between zero (0) and one (1).

19. The server selection method as claimed in claim 12, wherein there is further included a step of writing to a database a new currently available capacity indication for each of the plurality of servers.

20. A server selection method for a communication system for selecting one server from a plurality of servers, the server selection method comprising the steps of:

selecting the one server based on a currently available capacity indication for each of the plurality of servers;

detecting by the client a fault associated with the selected server;

adjusting a probability of selecting the server with the fault including a step of reducing the currently available capacity indication of the server; and iterating by the client the steps of detecting and adjusting including the step of reducing the currently available capacity indication for the server with the fault responsive to lower a probability of selecting the one server having the fault.

* * * * *